United States Patent [19]

Croucher, Jr. et al.

[11] Patent Number: 4,863,303
[45] Date of Patent: Sep. 5, 1989

[54] STRUCTURAL JOINT MEMBERS FOR SPACE FRAME SYSTEM

[75] Inventors: Meredith W. Croucher, Jr., Greenfield; James M. Fisher; Richard Letizia, both of Milwaukee; LeRoy A. Lutz, Brown Deer; Ralph F. Makowski, Milwaukee; Richard L. Moyse, New Berlin, all of Wis.; Richard W. Osgood, Nashville, Tenn.; John N. Rave, New Berlin, Wis.; Ward A. Wickwire, Mequon, Wis.; James F. Zillmer, Greendale, Wis.

[73] Assignee: Inryco, Inc., Mikwaukee, Wis.

[21] Appl. No.: 906,571

[22] Filed: Sep. 9, 1986

Related U.S. Application Data

[63] Continuation of Ser. No. 678,056, Dec. 4, 1984.

[51] Int. Cl.⁴ .............................................. B25G 3/00
[52] U.S. Cl. ...................................... 403/11; 403/27; 403/171; 403/320
[58] Field of Search ............... 403/171, 170, 176, 320, 403/296, 11, 27

[56] References Cited

U.S. PATENT DOCUMENTS

| | | | |
|---|---|---|---|
| 3,995,962 | 12/1976 | Mylaeus | 403/171 X |
| 4,313,687 | 2/1982 | Martinez | 403/320 X |
| 4,438,615 | 3/1984 | Wendel | 403/171 X |

FOREIGN PATENT DOCUMENTS 410185  3/1945  Italy ...................................... 403/171

Primary Examiner—Andrew V. Kundrat
Attorney, Agent, or Firm—Marshall, O'Toole, Gerstein, Murray & Bicknell

[57] ABSTRACT

Structural joint members for a space frame system with a node joint having threaded apertures, structural strut members with threaded end sections, and a connecting member. The connecting member includes an elongated threaded bolt, a fixed nut locked on one bolt end with a set screw, and a jam nut threadably engaging the other bolt end. The bolt threadably engages the node joint and the strut threaded end section with the fixed nut secured against the node joint and the jam nut secured against the strut end section to lock the structural joint members together. A snap-on cap covers the connecting member.

6 Claims, 3 Drawing Sheets

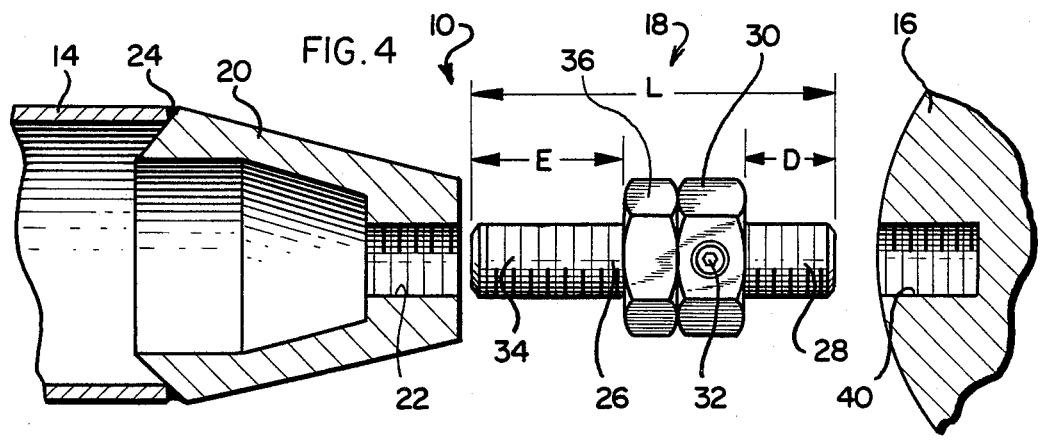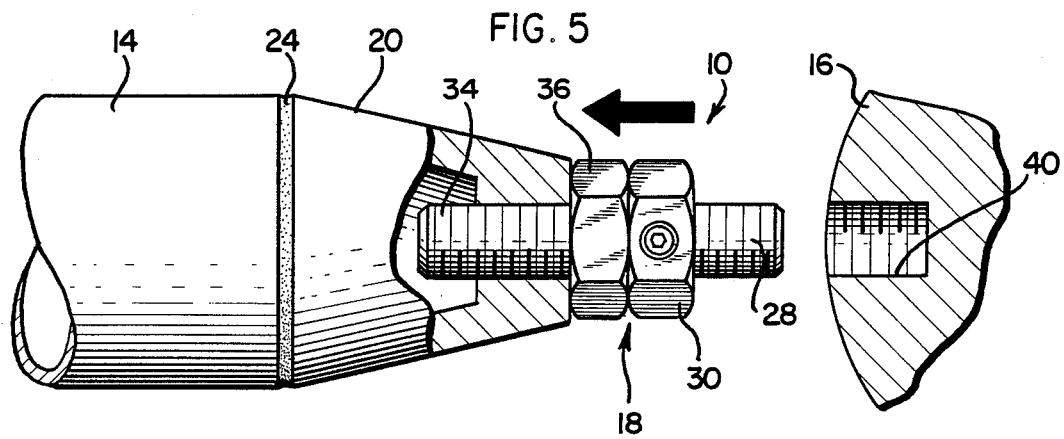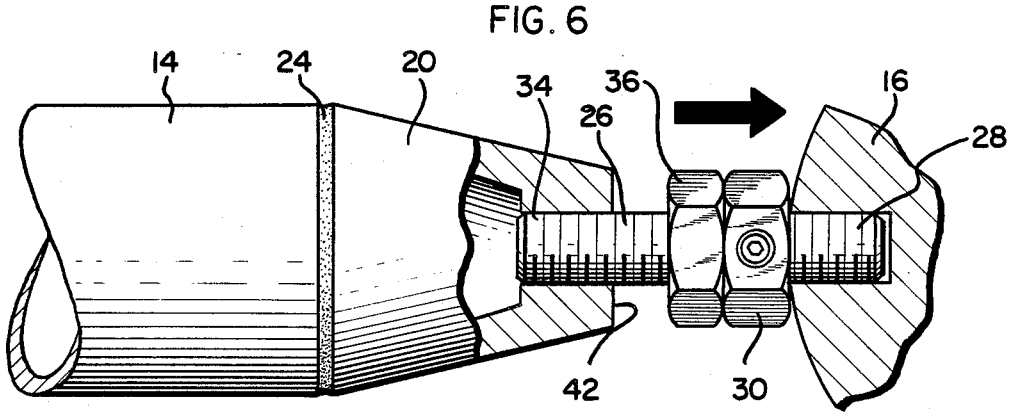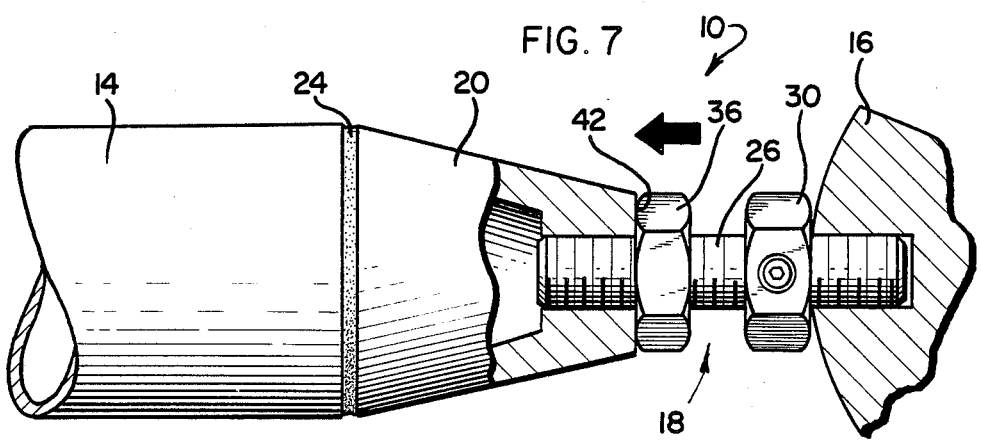

STRUCTURAL JOINT MEMBERS FOR SPACE FRAME SYSTEM

This application is a continuation, of application Ser. No. 678,056, filed Dec. 4, 1984.

This invention relates to space frame or space truss systems and more particularly to structural joint members for such a system.

BACKGROUND OF THE INVENTION

Reference may be made to the following patents of interest: Italian Pat. No. 410185; and U.S. Pat. Nos. 3,995,962; 3,789,562; 4,313,687; 4,353,662; 4,355,918; 3,632,147; 3,876,316; 3,980,408; 3,982,841; 4,027,449; 4,131,380; 4,193,706; 4,162,860; 4,371,279.

Currently available space frame and space truss systems include a plurality of structural elements, such as hollow tubes, arrayed in a geometric pattern, with the ends of the tubes connected together at joints or nodes by connecting members. A variety of connecting members are available cooperating with the tube end structure and the nodes for structurally interconnecting the joint elements.

In one such commercial unit, hollow tubular structural members are connected to the nodes by bolts slidably mounted in the tube ends and held from falling into the tube by a spanner sleeve pinned to the bolt. While this arrangement has been found relatively satisfactory in use, it is relatively expensive to manufacture because spanner sleeves or nuts with slots are utilized. Also, this structure requires an erection hole to be provided near the tube end so that prying pressure can be applied to the bolt head to aid in engaging the threads into the node. Thus, all structural members in such a system must be hollow. Furthermore, if the bolt threads are damaged significantly in shipping or handling, the entire member may have to be replaced, thereby increasing the cost of the system.

In other commercial systems, the nodes are hollow and access holes are provided to allow for tightening of the connecting bolts or nuts from inside the node. This type of system typically requires larger nodes with some type of removable cap on the node. The larger node size can be aesthetically displeasing, and the removable caps can provide an access point for undesired moisture to enter into the node. Tightening of the bolts or nuts from inside the node is often difficult and may require special tools. Also, in order to achieve the structural design capacity of compression members, extremely precise and consistent member lengths must be maintained. In addition, attachment of members or other items may be difficult or impossible to accomplish at the removable cap locations. The structural integrity of hollow nodes is also a concern which must be taken into account when designing and manufacturing these components.

Various other types of structural members are represented in the above-mentioned patents. Many of the above-mentioned patents illustrate a connecting member between the node and a structural rod in the space frame system wherein the connecting member is captured such as by an end cap or nut in either the node or the rod and may threadably engage the other member, as shown in U.S. Pat. Nos. 4,313,687; 4,353,662; 4,355,918 and others.

Certain of the patents illustrate a connecting member which threadably engages a node at one end and a structural rod member at the other end. For example, U.S. Pat. No. 3,995,962 employs a threaded bolt with different pitch threads on opposite bolt ends so that the bolt threadably engages the node faster than the bolt is threadably disengaged from the rod during assembly. In U.S. Pat. No. 3,789,562, a threaded node and threaded strut member are interconnected by a threaded bolt which threadably engages the node. A short plug or bushing has inner and outer threads with the inner threads engaging the bolt and the outer threads engaging the strut. In Italian Pat. No. 410185, one embodiment contains a threaded node and threaded rod with a threaded bolt threadably engaging both the node and the rod. A pair of nuts are threadably engaged on the bolt and are used to lock the assembly in position.

These aforementioned patents as well as the prior recited commercial units require a multiplicity of parts, some of which are of special construction and therefore expensive to manufacture. In many cases, such prior art units cannot be conveniently shipped without the possibility of losing many of the small components which requires a stockpile of extra components at the erection site, or delays the eventual erection of the space frame system. In other instances, such prior art units are inordinately complex and require special tools to assemble and are therefore expensive and time consuming.

Accordingly, it is desired to provide improved structural joint members for a space framework system in which the components are relatively simple and therefore inexpensive to manufacture, contain a minimum number of individual components and wherein the structural joint is as small as possible without sacrificing structural integrity. It is also desired to provide such components which can be pre-assembled for shipping while reducing component loss and which can be relatively easily assembled at the erection site.

SUMMARY OF THE INVENTION

In accordance with one aspect of the present invention, there is provided a unique combination of structural joint members for a space frame system including a node joint with a plurality of threaded apertures, an elongated structural strut member with threaded end sections, and an improved connecting member. The connecting member includes a threaded connector bolt with an upright abutment in the form of a fixed nut locked on the threaded connector at one end, and a jam nut threadably engaging the threaded connector bolt at the other end. The length of the connecting member can be held to a minus tolerance in the factory, thus allowing some adjustability in the field without sacrificing load carrying capacity.

The structural joint members can be assembled by initially threadably engaging the jam nut on the threaded connector bolt until it is snug up against the fixed nut. The connector bolt is then threadably engaged onto the strut threaded end section until the jam nut abuts the threaded end section, thereby locking the bolt, jam nut and strut member securely together. In this configuration, the connecting member and the strut can be pre-assembled conveniently for shipping purposes. Alternately, the threaded connector bolt assemblies can be shipped separately to minimize thread damage.

At the erection site, the fixed nut is rotated to threadably engage the connector bolt with the node joint threaded aperture while simultaneously the threaded bolt is extended outwardly from the strut end. The fixed nut is continued to be rotated until the fixed nut securely abuts against the node joint. The structural joint members are then securely locked into position by rotating the jam nut on the bolt until the jam nut abuts the threaded end section.

At the other end of the strut, the same connection is established with another node joint by utilizing another connecting member in the same manner as previously recited. A cover or cap can be snap-mounted on the jam nut and the fixed nut and thereby cover the threaded connector between the nuts.

In a preferred embodiment, a set screw is provided in the fixed nut so as to be engageable with the connector bolt for locking the fixed nut on the connector bolt and thereby forming an upright abutment at one bolt end. Other types of locking means can be utilized, such as welding the fixed nut to the bolt, or using a roll pin or drive pin passing through the fixed nut and into the connector bolt. Alternatively, opposite ends of a bar stock can be machine cut and threaded while leaving an upright abutment block in between. The snap-fit cover or cap installed over the nuts and bolt provides a more desirable appearance to the structural unit. Since in many cases, the space frames can be used in atriums, plazas, cathedrals or as support systems for skylights, window lights, deck or sun panels, a visually appealing structure is highly desirable.

BRIEF DESCRIPTION OF THE DRAWINGS

The invention may be best described by reference to the following description taken in conjunction with the accompanying drawings, in which like reference numerals identify like elements in the several figures and in which:

FIGS. 4–7 illustrate in sequence the assembly and locking together of the components at the erection site.

DETAILED DESCRIPTION

Figure 1:
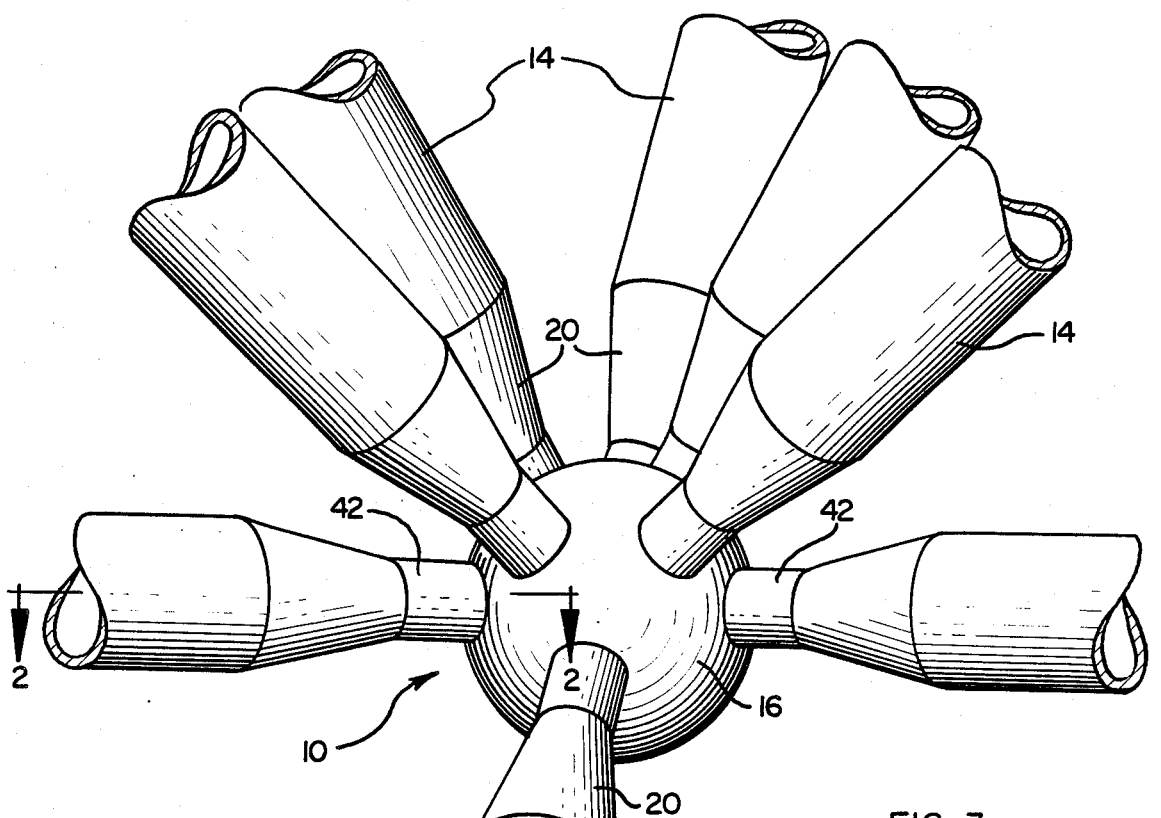
FIG. 1 is a fragmented perspective view of structural joint members constructed in accordance with the principles of the present invention.
Figure 2:
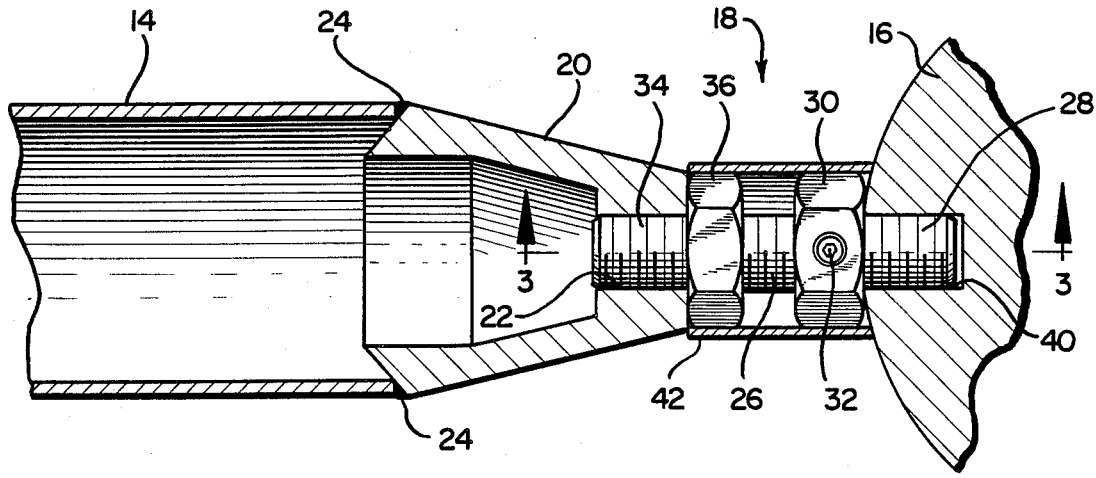
FIG. 2 is a sectional elevational view taken along section lines 2—2 of FIG. 1 illustrating construction details of a preferred embodiment of the structural joint members of the present invention.
Figure 8:
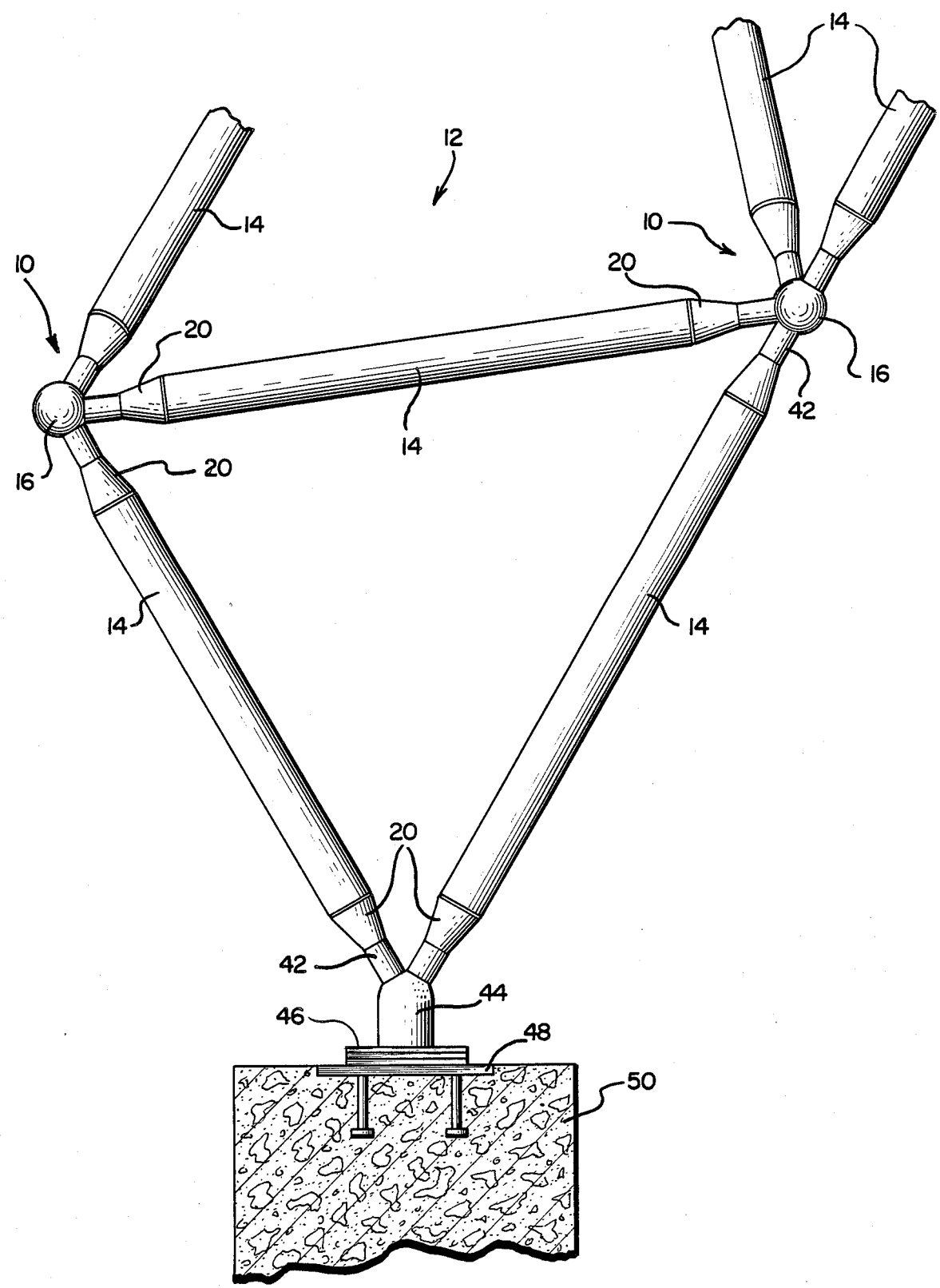
FIG. 8 is a fragmented elevational view illustrating a space framework structure with a plurality of structural joint members formed in accordance with the principles of the present invention.

Referring now to FIGS. 1 and 8, there is illustrated a combination of structural members 10, a plurality of which are included within a space framework system 12. The structural joint members include an elongated structural strut member 14 and a node joint 16, interconnected by a connecting member 18 (see FIG. 2). Structural strut member 14 can be provided as a hollow tube member as shown in FIG. 2 with threaded end sections 20 each having a threaded aperture 22. Alternatively, the strut may be formed of a solid rod, rather than a hollow tube member, with threaded end section 20. As shown in FIG. 2, strut member 14 can be attached to the threaded end section by weld bead 24.

Connecting member 18 includes an elongated threaded connector bolt 26 having a first end 28 on which there is mounted a fixed nut 30, preferably by means of a set screw 32 which passes through an appropriate aperture in the fixed nut so as to securely and rigidly engage connector bolt 26. Set screw 32 thereby locks the fixed nut 30 onto the threaded connector bolt. At an opposite connector bolt end 34 there is provided a jam nut 36 which is threadably engageable with the connector bolt.

Figure 3:
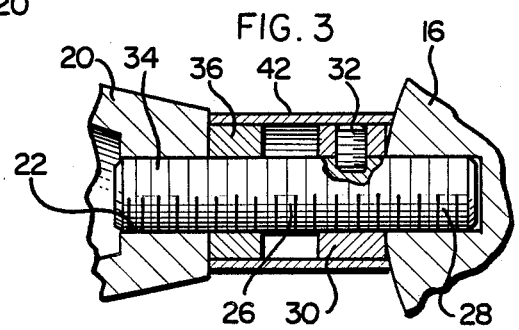
FIG. 3 is a sectional elevational view taken along section lines 3—3 of FIG. 2 illustrating the joint securely locked in position by a fixed nut with a set screw abutting a node joint and a jam nut locked against the end section of a structural strut member.

Node joint 16 is spherically shaped in the form of a solid metal ball, and includes a series of threaded apertures 40 for selectively mounting the strut member by means of connecting members 18. A cover 42 may be snap-fitted onto the nuts and threaded bolt so as to cover connecting member 18 as shown in FIGS. 1–3.

With reference to FIG. 4, strut member 14, node joint 16 and connecting member 18 are illustrated in their unassembled state. For shipping purposes or as the initial assembly step, jam nut 36 is engaged onto connector bolt 26 until it abuts against fixed nut 30. Next, as shown in FIG. 5, fixed nut 30 is rotated to threadably engage connector bolt end 34 within threaded aperture 22 of the strut threaded end section. Fixed nut 30 is continued to be rotated until jam nut 36 is locked against threaded end section 20 as shown in FIG. 5. In this pre-assembled condition, strut member 14 and connecting member 18 as well as node joint 16 can be shipped in quantities to the erection site. This significantly lessens the chances of losing the individual components during shipping as has occurred in prior art systems. However, in the event that damage to the connector bolt occurs, the bolt can easily be replaced without having to discard the entire strut member.

Next, at the erection site, the assembled strut and connecting member are placed adjacent and in line with a threaded aperture of a node joint. Fixed nut 30 is rotated so that threaded end section 28 threadably engages aperture 40 while the connecting member is slightly screwed out of end section 20 and moves longitudinally away from the end section. As illustrated in FIG. 6, the connector bolt is continued to be rotated until fixed nut 30 securely engages node joint 16. Thereafter, as shown in FIG. 7, jam nut 36 is threadably rotated on bolt 26 until it securely engages end face 42 of threaded end section 20 so as to lock together structural joint members 10.

With reference to FIG. 4, reference characters D, E and L have been illustrated as preferred dimensions for the connecting member. Specifically, D is shown as the dimension between fixed nut 30 and the bolt end on the same side thereof; dimension E is between jam nut 36 and the end of the bolt on the same side thereof; and dimension L is the length of the bolt. Specifically, it is preferred that dimension D is made about equal to the diameter of bolt 26; dimension E is made to be at least equal to twice the diameter of bolt 26; and dimension L is at least equal to three times the diameter of bolt 26 plus the width (see FIG. 4) of the jam and fixed nuts. As an example, a typical working assembly includes a 1 inch diameter bolt 4 and ⅝ inches long, a jam nut 35/64 inch wide (see FIG. 4), and a fixed nut 55/64 inch wide (see FIG. 4). Thus, the bolt length, L, of 4 and ⅝ inches (or 4 and 20/32 inches) is 7/32 inch greater than the "at least " length calculated from the above stated "at least " bolt length, L, equal to $3D+WJ+WF$, or 4 and 13/32 inches. The extra length, A, of 7/32 inch provides the "adjustability in the field without sacrificing load carrying capacity" which enables the length of the connecting member to be "held to a minus tolerance in the factory", as referred to previously.

It may be noted that the illustration of FIG. 5 at one joint 16 represents the same components at the other node joint at the respective opposite end of structural strut member 14. Thus, if two node joints 16 are already assembled in the space framework system, a pre-assembled strut 14 with connecting members 18 threadably engaging end sections 20 at each end of the strut member can be placed between the node joints and the connecting members thereafter threadably engaged with the respective node joints and securely locked in place.

FIG. 8 illustrates an example of an assembled space framework system with at least two node joints 16 and a plurality of strut members 14 connected thereto. As illustrated in FIG. 8, two of the strut members are connected to a base support node 44 with connecting members 18. Support node 44 also includes a plate 46 suitably anchored to a structural steel plate 48 in a masonry or concrete support 50.

As an alternative to set screw 32, a roll pin or drive pin could be used to fix nut 30 in position—or the nut could be welded in place. Another alternative is to machine cut and thread opposite ends of a bar stock while leaving a small abutment block in between. While these alternatives offer some minor advantages compared to the preferred set screw-fixed nut embodiment illustrated herein, there are major disadvantages in unreliable fixation, time consuming assembly, or higher costs involved in these alternatives compared to the preferred embodiment.

The foregoing detailed description has been given for clearness of understanding only, and no unnecessary limitations should be understood therefrom, as modifications will be obvious to those skilled in the art.

What is claimed is:

1. Structural joint members for a space frame enabling selective adjustment in the field of the assembled joint dimensions and thereby enabling the corresponding assembled space frame size and shape to be selectively, slightly adjusted during field assembly while readily permitting visual verification that such adjustment has been performed without sacrificing load carrying capacity of the joint, said structural joint members comprising:

a node joint having a plurality of threaded apertures;

an elongated strut with threaded end sections at opposite strut ends;

a connecting member for connecting the threaded end section to one of the threaded node joint apertures;

each connecting member including a threaded connector bolt, a fixed nut including drive means passing through the fixed nut and engageably contacting the connector bolt for locking the fixed nut on the threaded connector with a first threaded portion of the connector bolt extending outwardly therefrom, and a jam nut threadably engaging the threaded connector bolt with a second threaded portion of the connector bolt extending outwardly therefrom wherein D is at least equal to B and less than C, E equals 2B+A L equals 3B+WJ+WF+A, where A is the amount of linear dimensional adjustability desired in the assembled joint, B is the diameter of the connector bolt, D is the length of the first threaded portion of the connector bolt, E is the length of the second threaded portion of the connector bolt, L is the length of the connector bolt, WJ is the width of the jam nut, and WF is the width of the fixed nut, and C is the length of the node joint threaded aperture;

said aforementioned dimensional relationship enabling said linear dimensional adjustability amount, A, to be selectively utilized in the assembled joint during field assembly to selectively, slightly adjust the size and shape of the assembled space frame and to readily enable visual verification that such adjustment has been performed without sacrificing the structural integrity and thereby the load carrying capacity of the joint;

said connecting member, elongated strut and node joint being structurally interconnected by: (1) threadably engaging the second threaded connector bolt portion with the strut threaded end section by rotating the fixed nut until the jam nut abuts the threaded end section and the fixed nut; (2) threadably engaging the first threaded connector bolt portion with the node joint threaded aperture by rotating the fixed nut until the fixed nut abuts the node joint to threadably engage and embed said first threaded portion, D, in the node joint; and (3) rotating the jam nut on the threaded connector bolt until the jam nut abuts the threaded end section and the structural joint members are thereby locked together with the linear adjustability amount, A, being selectively utilized for said assembled frame size and shape adjustment while assuring structural integrity and thereby the load carrying capacity of the joint.

2. A space framework system according to claim 1, wherein said drive means includes a set screw in said fixed nut and engageable with the associated connector bolt.

3. A space framework system according to claim 2, wherein at least one of said node joints comprises a spherical ball shape and at least one of said threaded end sections comprises a threaded end cone.

4. A space framework system according to claim 3, including a cover adapted to be snapped onto one of said jam nuts and fixed nuts and covering the threaded connector therebetween.

5. A space framework system according to claim 1, wherein each of said elongated struts comprises a tubular strut member.

6. A space framework system according to claim 5, including a weld connection between said tubular strut member and said threaded end sections at opposite strut ends.

* * * * *